United States Patent [19]

Moore et al.

[11] Patent Number: 5,557,750
[45] Date of Patent: Sep. 17, 1996

[54] PREFETCH/PRESTORE MECHANISM FOR PERIPHERAL CONTROLLERS WITH SHARED INTERNAL BUS

[75] Inventors: Richard S. Moore, Irvine; Allan F. Pease, Orange, both of Calif.

[73] Assignee: Future Domain Corporation, Irvine, Calif.

[21] Appl. No.: 963,583

[22] Filed: Oct. 20, 1992

Related U.S. Application Data

[63] Continuation-in-part of Ser. No. 667,754, Mar. 11, 1991, abandoned.

[51] Int. Cl.[6] .................................................. G06F 5/06
[52] U.S. Cl. ............... 395/250; 364/DIG. I; 364/DIG. II
[58] Field of Search ............................................. 395/250

[56] References Cited

U.S. PATENT DOCUMENTS

| | | | |
|---|---|---|---|
| 4,062,059 | 12/1977 | Suzuki et al. . | |
| 4,384,327 | 5/1983 | Conway et al. . | |
| 4,635,194 | 1/1987 | Burger et al. . | |
| 4,716,525 | 12/1987 | Gilanyi et al. . | |
| 4,933,840 | 6/1990 | Sera et al. .................... | 395/250 |
| 4,975,829 | 12/1990 | Clarey et al. ................ | 395/275 |
| 5,204,951 | 4/1993 | Keener et al. ............... | 395/325 |
| 5,233,692 | 8/1993 | Gajjor et al. ................ | 395/325 |
| 5,237,660 | 8/1993 | Weber et al. ................ | 395/250 |
| 5,241,630 | 8/1993 | Lattin, Jr. et al. .......... | 395/325 |
| 5,276,807 | 1/1994 | Kodana et al. .............. | 395/200 |
| 5,283,872 | 2/1994 | Ohnishi ....................... | 395/325 |
| 5,287,460 | 2/1994 | Olsen et al. ................. | 395/275 |
| 5,299,315 | 3/1994 | Chin et al. .................. | 395/250 |
| 5,313,588 | 5/1994 | Nagashiga et al. .......... | 395/275 |
| 5,333,276 | 7/1994 | Solan ........................... | 395/325 |
| 5,410,674 | 4/1995 | Lawler ......................... | 395/500 |

FOREIGN PATENT DOCUMENTS

| | | |
|---|---|---|
| 287301A2 | 10/1988 | European Pat. Off. . |
| 451516A1 | 10/1991 | European Pat. Off. . |

*Primary Examiner*—Parshotam S. Lall
*Assistant Examiner*—Zarni Maung
*Attorney, Agent, or Firm*—Skjervin, Morrill, MacPherson, Franklin & Friel; Forrest E. Gunnison

[57] ABSTRACT

A single chip peripheral bus adapter circuit has a pair of input and output first in, first out (FIFO) buffers, a main buffer, and a pair of supporting registers. The registers increase the performance of the circuit by eliminating or reducing wait states.

5 Claims, 5 Drawing Sheets

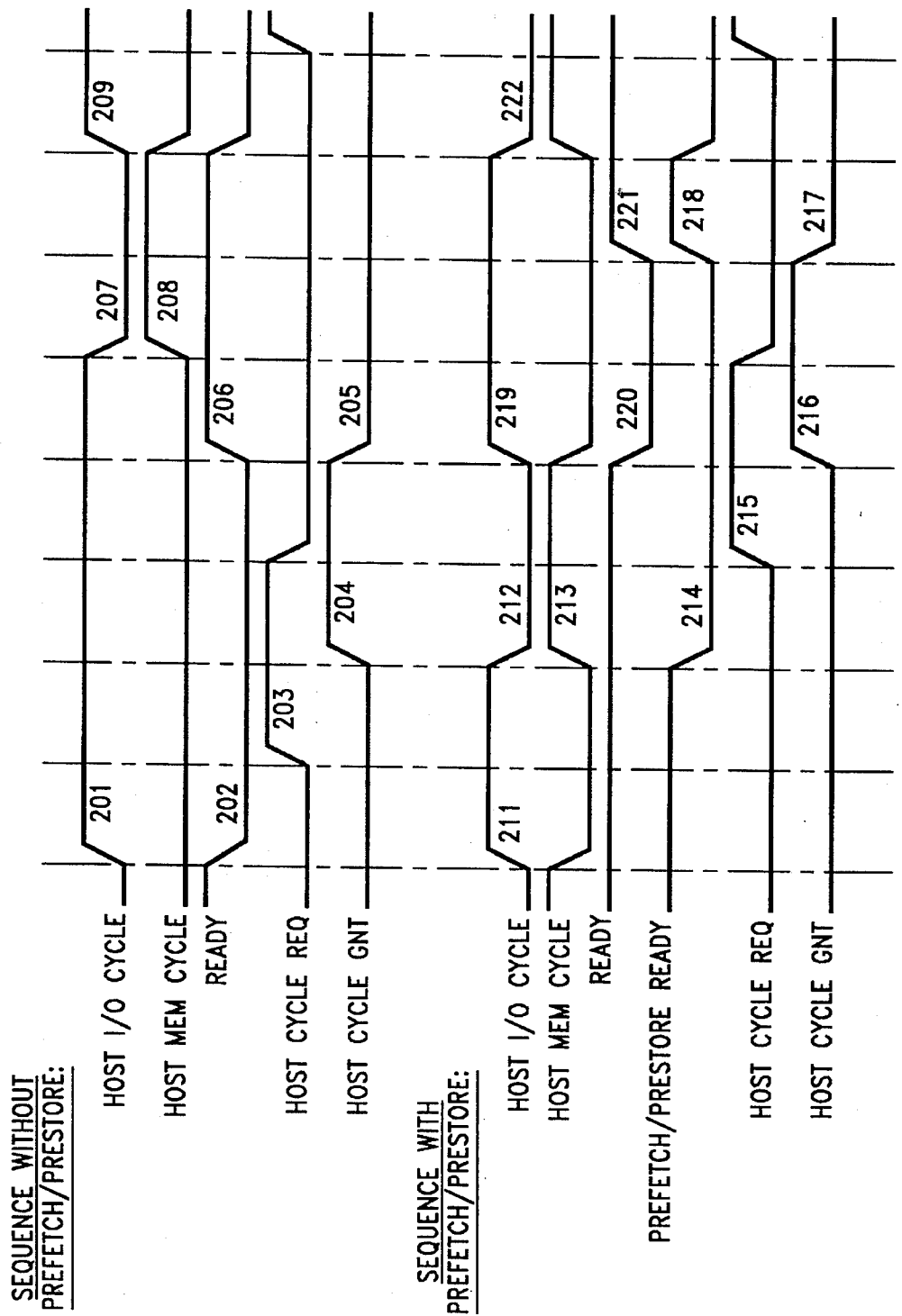

PREFETCH/PRESTORE MECHANISM FOR PERIPHERAL CONTROLLERS WITH SHARED INTERNAL BUS

CROSS REFERENCE TO RELATED APPLICATIONS

This application is a continuation-in-part application of U.S. Ser. No. 07/667,754, entitled "SCSI Controller" by Allan P. Pease, et al., filed Mar.11, 1991, (now abandoned).

TECHNICAL FIELD

The invention relates generally to computer bus interface circuitry. More particularly, the invention relates to an interface circuit for connecting a computer bus to a Small Computer System Interface (SCSI) bus.

BACKGROUND AN SUMMARY OF THE INVENTION

The Small Computer System Interface (SCSI) is a parallel input/output bus often used to connect disk drives, CD-ROM's, tape drives and other peripheral devices to a computer bus. The SCSI bus is a bidirectional, multimaster bus which can accommodate peer to peer communications among multiple CPUs and multiple peripheral devices. Because of this versatility, the SCSI bus is becoming increasingly important in the microcomputer field. A SCSI host adapter is a device for connecting a SCSI bus to an expansion bus of a host computer.

The apparatus of the present invention provides a means for enhancing performance of a SCSI host adapter, by reducing access time for the computer bus. The present invention can be used with any peripheral bus providing similar performances as those derived when used with a SCSI bus.

The present invention generally comprises a complete multifunctional SCSI chip that is shown to be in communication with a host bus. The host bus can be either the Industry Standard Architecture (ISA), the Micro Channel Architecture (MCA), the Extended Industry Standard Architecture (EISA), or other bus architecture as taught by U.S. patent application Ser. No. 667,754 filed on Mar. 11, 1991 by the inventor of the present invention, which application is hereby incorporated by reference.

More particularly, the apparatus generally comprises an internal data bus with a main FIFO ("first-in, first-out") buffer coupled to it. A first interface means is provided for coupling the SCSI bus to the internal data bus and a second interface means is provided for coupling the host computer bus to the internal data bus. Control logic gating means are provided for causing data communicated between the SCSI bus and the first interface means to flow onto the internal data bus and to further flow from the internal data bus into the main FIFO buffer (or in the opposite direction, as required).

The second interface means is used by the host computer when writing data to or reading data from the main FIFO. In the first case the host writes the data to a prestore register, which is located between the host bus and main FIFO. The prestore register does not require the host to wait for the next available internal data bus cycle, but instead buffers the data until an appropriate cycle is available. When this occurs, the prestore register moves its data to the main FIFO. This ensures the prestore register will be ready (i.e., empty) when the next host write cycle occurs. When data is being read from the main FIFO, the host accesses a prefetch register which lies between the host and the main FIFO. Data in this register is fetched from the main FIFO during available internal data bus cycles. This allows the data to be available when the host requests it, eliminating host waiting for an internal data bus cycle. By thus eliminating wait states, overall system performance is significantly enhanced.

The apparatus of the present invention is well suited for single chip implementation of an SCSI host adapter. Dual small first in, first out (FIFO) buffers in the first interface means are used to provide a circuit which supports both asynchronous and synchronous SCSI bus transfer modes. The prefetch register as well as the prestore register are implemented to reduce delays in the form of additional wait states. In its presently preferred embodiment, the only external components needed are a suitable oscillator.

It should be appreciated that the smaller FIFOs are high-speed, low latency devices which support the offset between data requests and acknowledges (required for synchronous SCSI), while the larger main FIFO is a slower device intended to compensate for the difference between data rates of the host and SCSI buses.

The host adapter of the present invention supports asynchronous and synchronous protocols conforming to the SCSI specification known as the SCSI-2 specification proposed by the American National Standards Institute (ANSI) and further described in the X3.131-199x; X3 Project 503-D prepared by the Technical Committee X3T9 of the I/O interface accredited Standards Committee, X3-Information Processing Systems. These documents are also hereby incorporated by reference.

The apparatus of the present invention further includes logic circuitry for handling SCSI bus arbitration, logic for automatic control of request/acknowledge handshakes and interrupt generation logic. The apparatus provides FIFO buffering of data as described above with additional buffering provided by the prestore and prefetch registers.

The apparatus of the present invention is thus very flexible and well adapted for use in a wide variety of SCSI applications and is particularly well adapted for, but not limited to, use in SCSI applications.

For a more complete understanding of the preferred embodiment of the present invention and its many objects and advantages, reference may be had to the following detailed specification and to the accompanying drawings.

BRIEF DESCRIPTION OF THE DRAWINGS

FIG. 2 is a timing diagram graphically illustrating the performance enhancement derived by implementing the presently preferred embodiment as compared with prior art.

DESCRIPTION OF THE PREFERRED EMBODIMENT

Figure 1:
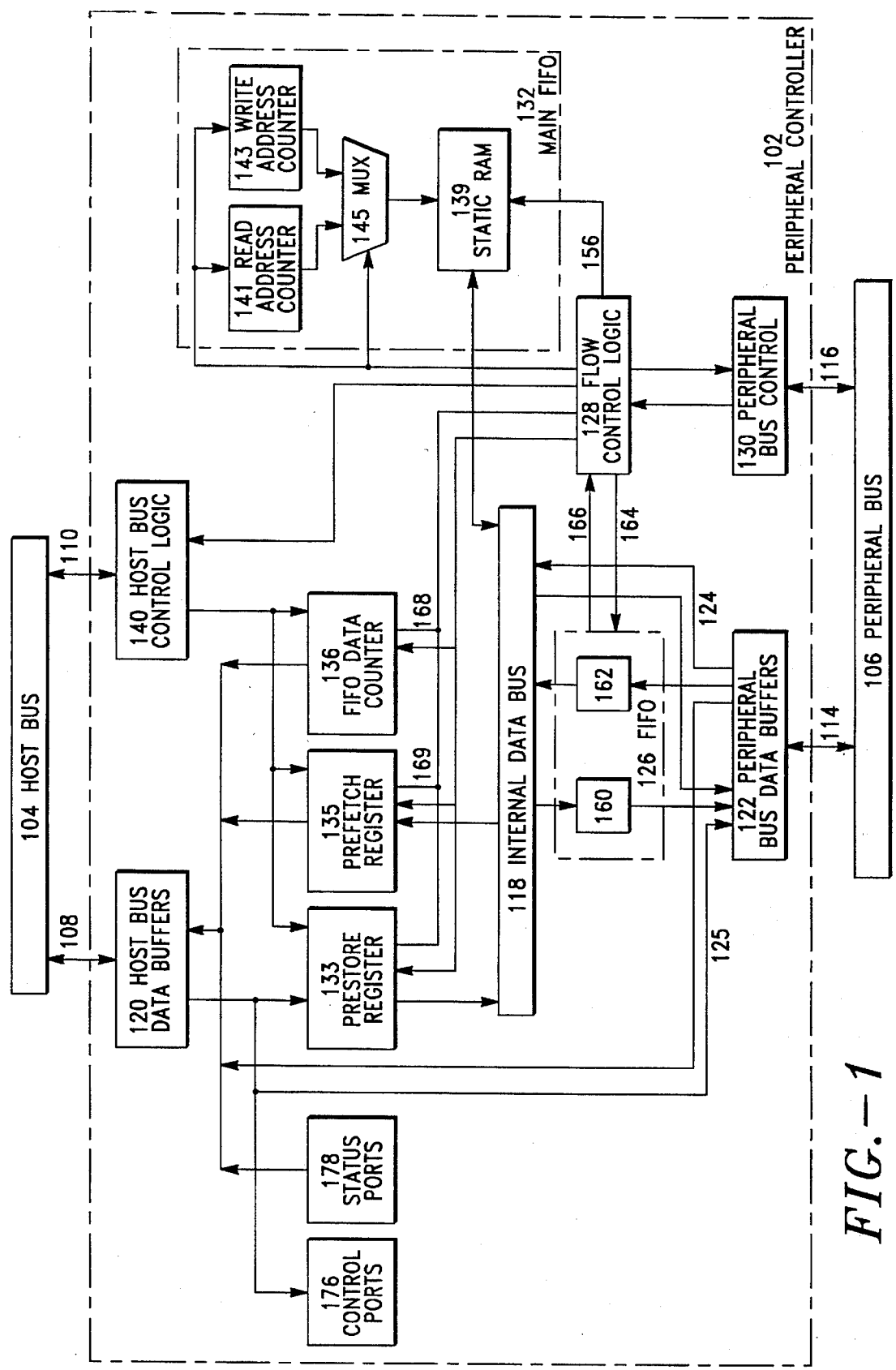
FIG. 1 is a block diagram of a preferred embodiment of an apparatus in accordance with the present invention giving a general system overview.

Referring to FIG. 1, the host adapter is depicted by a functional block diagram. The host adapter circuit, shown generally at 102 is adapted for interconnection between the host computer bus, shown generally at 104, and the peripheral bus, shown generally at 106. For convenience, the host computer bus has been broken into the following components: host data bus 108 and host bus address and control 110. Similarly, the peripheral bus is illustrated as comprising the data bus 114 and control bus 116. The host adapter circuit 102 includes a shared internal data bus 118.

The host data bus 108 is connected to the internal structures through a data bus buffer 120. The peripheral data bus 114 is likewise provided with a peripheral data bus buffer 122. Peripheral data bus buffer 122 is coupled to the internal data bus 118 through two alternate paths: an asynchronous data path 124 and a bidirectional input/output first-in first out buffer (I/O FIFO) 126. There is also a direct data path 125 between the host data buffers 120 and the peripheral data bus buffer 122. The I/O FIFO 126 is controlled by data flow control logic 128. The data flow control logic 128 in turn interacts with peripheral control logic 130, which is interactive with signals on the peripheral control bus 116. In the presently preferred embodiment I/O FIFO 126 is a 16 byte bidirectional FIFO for handling the offset or latency which can occur during synchronous data transfers. This is done even although the SCSI standard allows for larger or smaller offsets. In the synchronous mode, there is a negotiation which takes place prior to data transmission during which time the rate of transfer and offset are established. An offset of 16 allows up to 16 data requests to be queued up without the need to acknowledge. The size of I/O FIFO 126 must be sufficient to accommodate the maximum offset established for the design. Although a 16 byte I/O FIFO is employed in the present embodiment, different FIFO sizes are also possible and contemplated by the invention.

The host adapter 102 also includes a main FIFO 132, which is coupled to the internal data bus 118. The internal data bus 118 is in turn coupled to the host data bus 108 through prestore register 133 and prefetch register 135. It should be noted that the prestore register 133 provides a path from the host data bus 108 to the internal data bus 118, while the prefetch register 135 provides a second path from the internal data bus 118 to the host data bus 108. The prestore register 133 and the prefetch register 135 are each undirectional, supporting data flow in one direction. The prefetch register 135 allows data to be fetched from the main FIFO 132 during available internal bus cycles, but between host bus accesses, allowing the data to be present when the host requests, requiring no additional waiting. Conversely, when writing data to the main FIFO 132, the host first writes the data to the prestore register 133. Like the prefetch register 135, the prestore register 133 does not require the host to wait. After a write cycle terminates, the prestore register 133 moves its data to the main FIFO 132 during available internal bus cycles, so the prestore register 133 will be empty when the next host write cycle occurs. Data buffering through prestore register 133 and prefetch register 135 results in improved performance during read and write operations.

In the presently preferred embodiment the main FIFO 132 is implemented using static random access memory 139. An 8K×8 bit main FIFO 132 is presently employed. However, different storage sizes (e.g., 4 k byte or smaller) and data widths (e.g., 16 bit or larger) may be employed to meet future circuit requirements. These considerations may also motivate incorporation of the RAM into the host adapter chip.

In the present implementation, the main FIFO 132 also consists of a read address counter 141, a write address counter 143, and an address multiplexer 145. The multiplexer 145 selects the output of either the read address counter 141 or the write address counter 143 and addresses the static RAM 139. The FIFO 132 has associated with it a data counter 136. When the main FIFO 132 is written with new data, the write address counter 143 and the data counter 136 are incremented. When data is read from the main FIFO 132 the read address counter 141 is incremented and the data counter is decremented.

The FIFO data counter 136 is coupled to the data flow control logic 128 and also to the host data buffers 120. The FIFO data counter monitors the number of valid data bytes in the main FIFO 132 and provides this numeric value for the host computer to determine the appropriate block size for data transfers.

The circuit also includes host bus control logic 140, coupled to the host bus control lines 110. The host bus control logic 140 provides address and command decoding and generates wait states on the host bus by deasserting a ready signal whenever required.

The I/O FIFO 126 is shown in FIG. 1 as comprising a 16×8 output FIFO 60 and a 16×8 input FIFO 162. Both of these FIFOs are coupled to the internal data bus 118 for data communication in the directions shown. Data flow control logic 128 controls both FIFOs 160 and 162 in secondary the input/ FIFO 126 via load/unload signals 164. The status of both FIFOs is provided to the data flow control logic 128 via the input/output FIFO 126 status signals 1666. Main FIFO 132 status from the data counter 136 is provided to the data flow control logic 128 via the main FIFO 132 status signals 168. Prefetch and prestore status are provided to the flow control logic 128 by status signals 169.

The data flow control logic 128 is responsible for coordinating incoming SCSI requests with outgoing SCSI acknowledge signals. Peripheral control logic 130 receives request (REQ) signals from the peripheral control bus 116 and provides an indication thereof to the data flow control logic 128. Depending on the mode of communication selected, the data flow control logic 128 can command the peripheral control logic 130 to place an acknowledge (ACK) on the peripheral control bus 116.

Being an I/O mapped implementation, the circuit of the invention provides a plurality of control ports and status ports which the host computer may access for performing desired functions and gaining certain information. In FIG. 1, the control ports are designated generally by reference numeral 176 and the status ports by reference numeral 178.

Programmed I/O (PIO) is used to transfer data to and from the main FIFO 132 over the host bus 104. In this method of operation, input and output instructions are used to access the main FIFO 132; these I/O cycles alternate with memory cycles in which the data read from (or the next data to be written to) the main FIFO 132 is written to (or read from) the system memory. Many processors provide repetitive "block" or "string" I/O instruction which allows PIO operations to proceed continuously, with no intervening instruction fetches, for extended transfer lengths. The architecture of the preferred embodiment of the present invention takes advantage of such "repeat string" I/O operations.

For both reads and writes of the FIFO 132, the data is communicated within the host adapter 102 by means of the shared bus. The bus sharing is done for reasons of economy (single-port RAMs are less costly than dual-port RAMs). Because of this shared bus architecture, the flow control logic 128 must regulate which process (reading or writing) has access to the internal bus 118. The bus sharing results in frequent delays, as one process is forced to wait while the other process has access to the shared internal bus. Since the (I/O FIFO) transfer cycles may take place at a very high rate, and therefore potentially consume the full bandwidth of the internal bus 118, the host bus transfers are given priority by the flow control logic 128. This measure partially alleviates the negative impact of the shared bus on the overall performance of the host adapter. Nevertheless, since the host process request for the internal bus must be synchronized with the clock of the internal bus, and furthermore, since an internal bus cycle for the I/O FIFO 126 may already have been initiated at the time the host cycle occurs, wait states must be injected on the host bus 104. Also, the width of the internal bus 8 may be less than that of the host bus 104. For example, a host adapter connected to a 16-bit bus might have an 8-bit internal data path. In such a case, more than one internal bus cycle will be required for each host bus access cycle, and the number of wait states must be increased accordingly. The wait states delay the completion of the I/O cycle, as well as the following memory cycle and hence the start of the next I/O, resulting in a reduction in performance. The prefetch register 135 and prestore register 133 provide a mechanism for virtually eliminating these wait states.

The basic operation of a host adapter without the prefetch/prestore enhancement includes: transferring data from the host system to the peripheral bus while the host interface accepts data from the host computer, waits for the internal data bus to become available, and then transfers the data over the internal data bus to the main FIFO 132. This requires one or more internal bus cycles, depending on the relative sizes of the host data bus 104 and the internal data bus 118, as discussed above. The presence of data in the main FIFO 132, coupled with the readiness of the secondary FIFO 126 (output half) to accept data, causes the flow control logic 128 to enable the transfer of data from the main FIFO 132 to the secondary FIFO 126. The data is then transferred from the secondary FIFO 126 to the peripheral bus 106 in accordance with the peripheral bus handshake protocol. In the case of a SCSI bus, this protocol is controlled by a request/acknowledge signal pair.

When data is transferred from the peripheral bus 106 to the host bus 104, the peripheral data is first loaded (by a request signal, in the case of SCSI) into the secondary FIFO 126 (input half). The presence of data in the secondary FIFO 126, coupled with the availability of space in the main FIFO 132 causes the flow control logic 128 to enable the transfer of data from the secondary FIFO 126 to the main FIFO 132. When the host computer reads the main FIFO 132, wait states are inserted to ensure the availability of an internal bus cycle. When the internal bus 128 is available, the main FIFO's 132 data is transferred (in one or more internal bus cycles) to the host bus 104.

The present invention involves the addition of prefetch register 135 and prestore register 133. This changes the operational sequence of host bus accesses to the main FIFO 132. While writing data to the main FIFO 132, the host write cycle can be completed without a wait state, provided the prestore register 133 was initially empty. The write operation causes the data to be stored in the prestore register 133, setting it to a full state. The transfer of data from the prestore register 133 to the main FIFO 132, in one or more internal bus cycles, follows during the memory cycle which takes place between successive I/O write cycles. This ensures that the prestore register 133 is empty again in time for the next write. Thus, the host is not required to wait for the internal bus cycle when writing to the FIFO 132.

While reading data from main FIFO 132, the prefetch register 135 begins in an empty state. If data is present in the main FIFO 132 during this empty state, one or more FIFO prefetch transfers occur until the prefetch register 135 reaches a full state. When a host read cycle takes place, it empties the prefetch register 135 again, and another series of FIFO prefetch cycles is allowed to occur. Since the FIFO prefetch cycles occur between I/O read cycles (during the intervening memory cycle), the prefetch register 135 is always ready when a host bus read of the FIFO takes place. Thus, the host is not required to wait for the internal bus cycle when reading the main FIFO 132.

Exceptions to the normal prefetch and prestore operation may occur. If the host computer bus 104 is extremely fast, there may be insufficient time between I/O cycles for the prefetch or prestore cycles to complete. Under this condition, wait states will be inserted on the host bus due to the unready state of the prefetch or prestore register. However, these wait states will be shorter than those that would occur without the prefetch register 135 and prestore register 133.

Another exceptional sequence occurs if the main FIFO 132 is full when the host attempts to write to it, or if the main FIFO 132 is empty when the host attempts to read it. As a result of this condition, the prestore register 133, in the case of a write, or prefetch register 135, in the case of a read, will not become ready until the state of the main FIFO 132 changes and the necessary internal bus cycles take place. If this does not happen within a prescribed time, which is dictated by the host bus architecture, then the host system may hang. Two mechanisms are provided to alleviate this problem. The first mechanism is preventive. The FIFO data counter 136 provides a count of the number of bytes of data in the main FIFO 132. This count must be used by the controlling software to regulate the number of bytes transferred in each "repeat string" I/O instruction, so that there is no way for the software to cause such an overflow or underflow condition. The second mechanism is a failsafe mechanism. In the unlikely event that an overflow or underflow does occur (due to a hardware fault, for example), a bus timeout mechanism is provided in the host bus control logic 140. If the wait state duration approaches the maximum prescribed length for the given host bus architecture, the bus timeout circuit triggers, causing the wait state to be terminated and a flag to be set. The flag may be used to trigger an interrupt and/or read as an error flag in the controller's status registers The detection of this bus timeout flag may be used by the application or driver to trigger the execution of an appropriate error recovery routine.

FIG. 2 shows the effect the prefetch register 135 or prestore register 133 have on bus timing in a generic bus architecture. The same principles of operation apply to ISA, EISA, and MCA buses as well as any other bus architecture which uses a "Ready" signal generated by the slave device to control bus timing.

The basic operation of the controller without the prefetch/prestore enhancement is shown (not to scale) in the top half of FIG. 2. The sequence is described as follows:

When the host system initiates an I/O command 201, the host adapter 102 responds by deasserting the bus ready signal 202. After a delay for internal synchronization, the host bus control logic 140 generates a host request 203 for the internal data bus 118. When the flow control logic 128 responds to this request by granting an internal cycle 204 for the host, the host adapter 102 transfers the data between the host data bus 104 and the main FIFO 132. This requires one or more internal bus cycles, depending on the relative sizes of the host data bus 104 and the internal data bus 118, as previously discussed. At the end of the transfer 205, the controller asserts the bus ready signal 206 so that the I/O command 201 can be terminated 207. The intervening memory cycle 208 is followed by the next I/O cycle 209. This sequence holds regardless of the direction of transfer.

With the addition of prefetch register 135 and prestore register 133, the operational sequence changes as shown in the bottom half of FIG. 2. The new sequence is described as follows: The host I/O cycle begins 211 and ends 212 without a wait state (i.e. provided the prestore register 133 was initially ready), which is followed by a host memory cycle 213. The prefetch register 135, for read operations, or prestore register 133, for write operations, becomes not ready 214 after the I/O cycle 211 terminates. After a delay for synchronization, the host bus control logic 140 generates a request for an internal bus cycle 215. When the flow control logic 128 grants the use of the internal data bus 118 to the host 216, the host adapter 102 transfers data between the prefetch register 135 or prestore register 133 and the main FIFO 132. The transfer is completed 217 after one or more internal bus cycles, depending on the relative sizes of the host bus 104 and the internal bus 118. When the transfer is completed, the prefetch register 135 or prestore register 133 returns to a ready state 218. Since events 214 through 218 take place partially or completely during the memory cycle 213, the prefetch register 135 or prestore register 133 is ready or nearly ready when the next I/O cycle 219 begins. In the event the prefetch register 135 or prestore register 133 is not ready at the start of an I/O cycle 211, 229, the controller deasserts the bus ready signal 220. When the prefetch register 135 or prestore register 133 becomes ready 128, the host adapter 102 asserts the bus ready signal 221. The host then terminates the I/O cycle 222.

Although timing in FIG. 2 is not drawn to scale, one can see by examining the diagrams that the I/O cycles 211, 219 will be shorter in the second case, while the memory cycles 213 are unchanged. The vertical lines in the figure represent discrete time intervals defined by one or more cycles of either the host bus clock or the internal host adapter clock. In cases where the internal clock and bus clock are of approximately the same frequency, the sequence takes place as shown and the earlier start of the host cycle request/grant sequence shortens the I/O cycle 211. However, the internal clock is usually considerably faster than the bus clock, so that the internal sequences (specifically the prefetch or prestore ready signal 214 and the host cycle requests 215 and grants 216) take less time to complete than the host bus cycles. Under these circumstances, the prefetch or prestore register ready condition 218 occurs before the start of the next I/O cycle 219. In this case, the wait state 220 does not occur at all, so that the use of the prefetch register 135 and prestore register 133 allows PIO transfers to run at the maximum bandwidth allowed by the host bus 104.

Figure 3A:
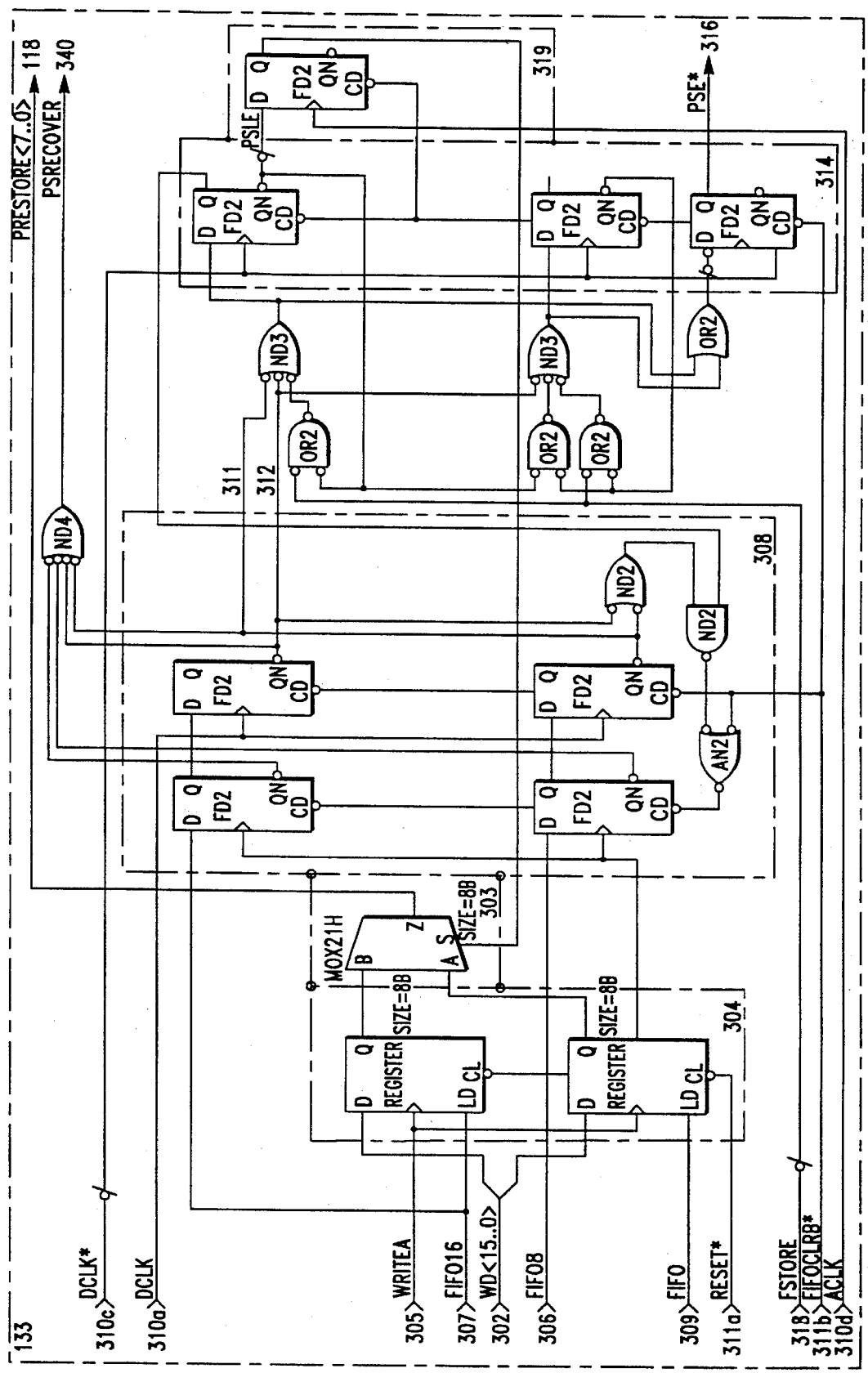
FIGS. 3a, 3b, and 3c are schematics of the blocks shown in FIG. 1.
Figure 3B:
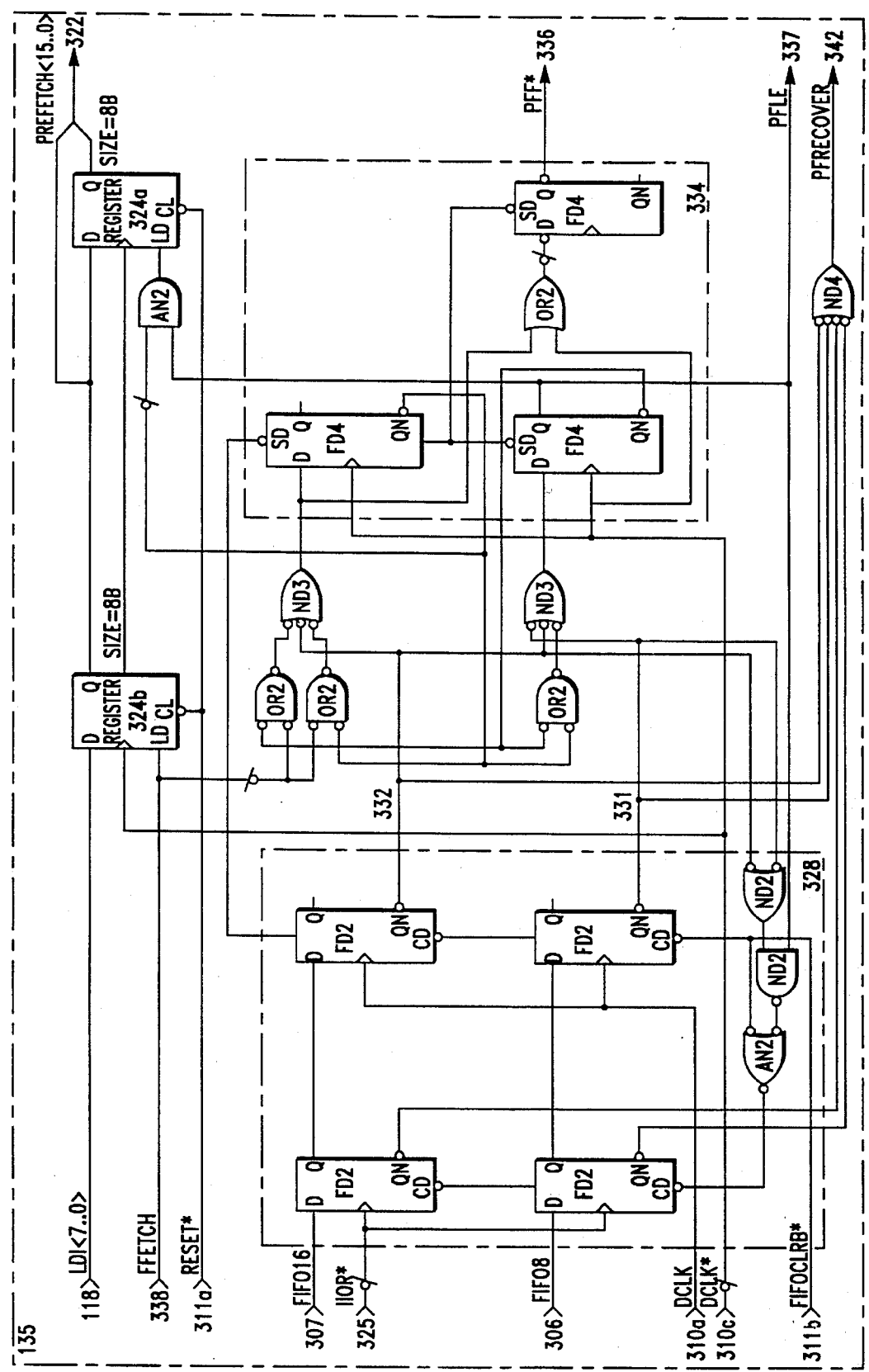
Figure 3C:
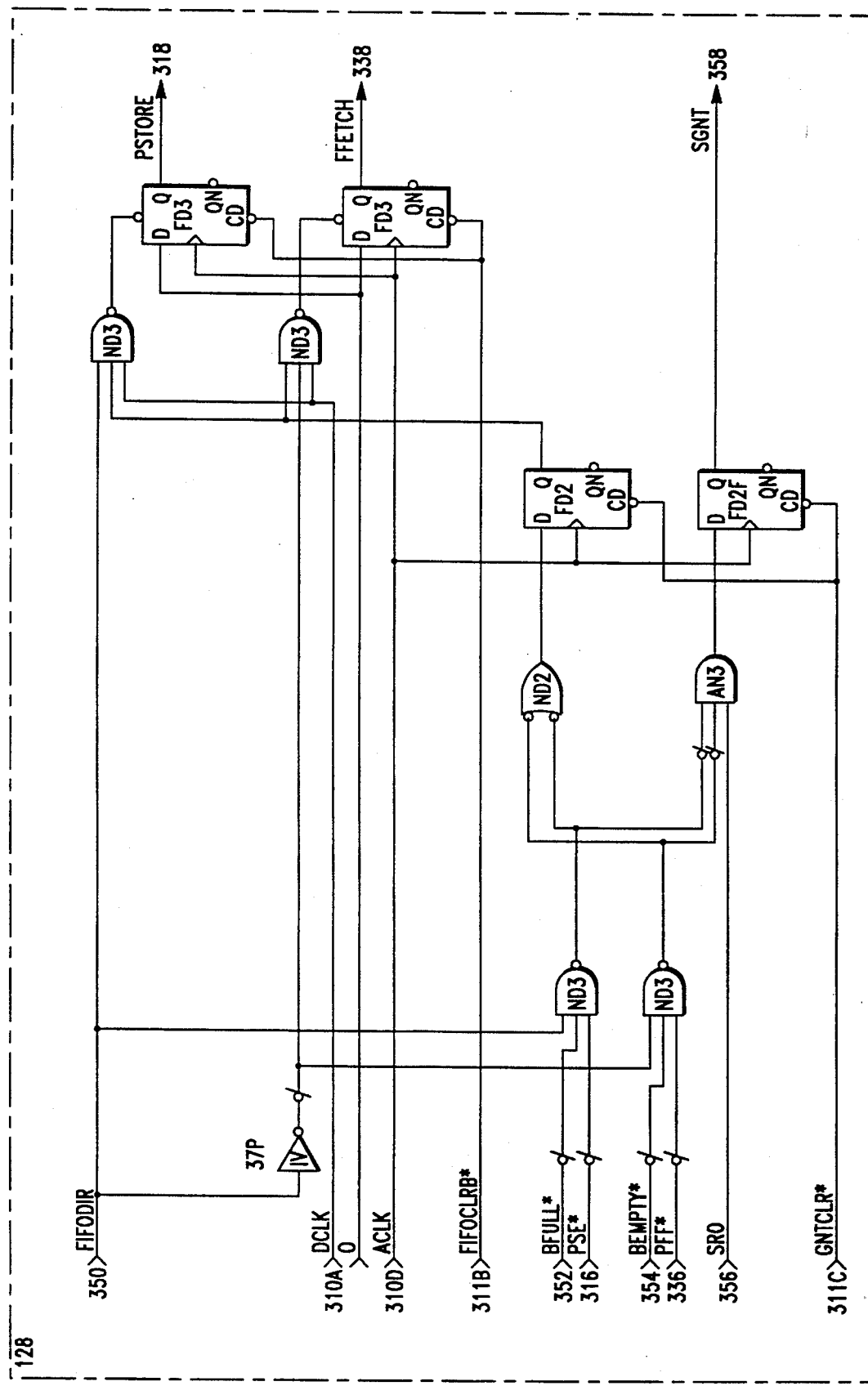

FIG. 3a, 3b, and 3c present schematics of the prefetch, prestore, and flow control logic circuits. Several general signals are used by these circuits. In the present embodiment, four clock signals 320 constitute the timing sequence of the internal bus 118. These clocks, each having a duty cycle of 50%, are separated from each other by 90 degree phase delays, and hence subdivide the internal bus cycle into four equal phases. In order of occurrence within an internal bus cycle, these clocks are named DCLK 310a, ACLK* (not shown), DCLK* 310c, and ACLK 310d. The significance of these signals is as follows: on DCLK, a new cycle is begun on the internal bus, and the proper source and destination for the desired transfer are selected. The phase represented by ACLK* is essentially a destination data and control setup period. On DCLK*, the destination is clocked, loading the new data from the source. On ACLK, the type of transfer for the next cycle is decided (this may be a prestore-to-FIFO transfer, a FIFO-to-prefetch transfer, a FIFO-to-peripheral interface transfer, or a peripheral interface-to-FIFO transfer). Finally, a new DCLK ends one cycle and begins the next cycle.

In the present embodiment, a write strobe WRITEA 305 and a read strobe IIOR* 325 signal the completion of an asynchronous host bus write or read, respectively, with a rising edge. If the FIFO is being accessed (i.e., via the prefetch 135 and prestore registers 133), an appropriate enable signal is asserted. This signal is FIFO8 306 for an 8-bit transfer, or FIFO16 307 for a 16-bit transfer. A third signal, FIFO 309 is the logical OR of FIFO8 and FIFO16.

A number of reset signals are provided in the present embodiment. The master reset is labelled RESET* 311a. A second reset, FIFOCLRB* 311b is the logical OR of RESET* with a software-generated strobe (produced by writing a one to the appropriate bit in one of the control ports 176). A third reset, GNTCLR*, 311c, provides a sequenced reset of the flow control logic; it is simply a synchronous extension of the master reset, RESET*.

The embodiment represented in FIG. 3 represents the prefetch and prestore registers used in a host computer that uses little-endian byte order (i.e., the least significant byte of a word is addressed first). A big-endian byte order could be accommodated by switching the connections of the least-significant and most-significant bytes to the host data bus 104.

The prestore register 133 is shown in detail in FIG. 3a. In this embodiment, the prestore register interconnects a 16-bit write data bus 302 to an 8-bit internal data bus 118. Write data bus 302 is a buffered extension of host data bus The write data bus is connected to the input side of a 16-bit register 304. The outputs of each byte of register 304 are connected to multiplexer 303, which is connected in turn to the internal data bus 118.

Data is clocked into register 304 by a write command strobe 305 originating from the host control bus. Either an 8-bit FIFO enable (FIFO08 306) or a 16-bit FIFO enable (FIFO16, 307) may be used. A synchronizer 308 captures the write strobe and synchronizes it to DCLK 310a, producing a synchronized write strobe pulse 311 (for 8-bit access) or 312 (for 16-bit access). The synchronized pulse 311 or 312 then causes a group of flags 314 to be updated. The flags 314 drive a status signal for prestore not empty states (PSE*, 136) which is used to indicate the prestore register status to flow control logic 128 and host bus control logic 140.

When an internal bus cycle is granted for the prestore register 133, the prestore grant signal (FSTORE, 318) is set. This state allows the transmission of one byte of register 304 (selected by multiplexer 303, as determined by a delayed prestore low empty flag from flip-flop 319) onto the internal data bus 118. The flags 314 are simultaneously updated to reflect the new status (empty) of the selected byte.

The prefetch register 135 is shown in detail in FIG. 3b. In this embodiment, the prefetch register 135 interconnects an 8-bit internal data bus 118 to a read data bus 322, which is a buffered extension of host data bus 108. The read data bus is connected to the output side of a 16-bit register 324, which consists of a first byte 324a and a second byte 324b. The input of 324a is connected to the output of 324b, and the input of 324b is connected to internal data bus 118.

Data is read from register 324 on the occurrence of a read command strobe 325 originating from the host bus. Either the 8-bit FIFO enable (FIFO8, 306) or a 16-bit FIFO enable (FIFO16, 307) may be used. A synchronizer 328 captures the read strobe and synchronizes it to DCLK 310a, producing a synchronized read strobe pulse 331 (for 8-bit access) or 332 (for 16-bit access). The synchronized pulse 331 or 332 then causes a group of flags 334 to be updated. The flags 334 provide indications of prefetch not full states (PFE*, 336), and prefetch low byte empty states (PFLE, 337), which indicate the prefetch register state to the flow control logic 128 and the host bus control logic 140.

When an internal bus cycle is granted for the prefetch register, the prefetch grant signal (FFETCH, 338) is set. This allows the data on the internal bus 118 to be transferred into the register second byte 324b. The flags 334 are updated to reflect the fact that the second byte is now full.

Furthermore, on any cycle (regardless of the state of prefetch grant 338), if the second byte 324b is full and the first byte 324a is empty, 324a is updated with the data of 324b and the flags 334 are updated to reflect this transfer.

Flow control logic 128, shown in FIG. 3c, employs a control signal (FIFODIR, 350) which determines whether prefetch or prestore cycles are enabled. When FIFODIR is set, transfers from the prestore register to the FIFO are enabled, when FIFODIR is cleared, transfers from the FIFO to the prefetch register are enabled. Thus, data is allowed to move in only one direction at a time. FIFODIR originates in control ports 176, and therefore is under host system software control.

Flow control logic 128 also employs two signals originating in the FIFO data counter 136. These signals are labelled BFULL* 352 which when high indicates the main FIFO buffer 132 is not full, and BEMPTY* 354 which when high indicates the main FIFO buffer 132 is not empty.

If FIFODIR is set, then a FIFO prestore grant (FSTORE 318) is issued whenever the prestore register 133 is not empty (PSE*, 316) and the main FIFO 132 is not full (BFULL*, 352). Similarly, if FIFODIR is clear, then a FIFO prefetch grant (FFETCH, 338) is issued whenever the prefetch register 135 is not full (PFF*, 336 and the main FIFO 132 is not empty (BEMPTY*, 354).

Transfers between the main FIFO 132 and the secondary FIFO 126 or the peripheral bus data buffers 122 are allowed when the signal SGNT 358 is set. SGNT is set following the assertion of a request from the peripheral interface control logic 130, provided that the conditions given in the previous paragraph for a prefetch or prestore access are not met. The request from the peripheral interface control logic is labelled SRQ 1356 in FIG. 3c. The provision (that the prefetch and prestore access conditions must not be met in order for SGNT 358 to be set) prevents the peripheral bus 106 (which usually has a higher bandwidth than the host bus 104) from dominating the use of the internal data bus 118.

Host control logic 140 is responsible for ensuring that prestore register 133 is not overwritten prematurely (i.e. before the previously written data has been moved to FIFO 132), and for ensuring that prefetch register 135 is not read prematurely (i.e., before the data to be read has been transferred from FIFO 132). If prestore register 133 is accessed while full or partially full (as indicated by a high signal state on PSE* 316), host control logic 140 deasserts a ready signal on the host control bus 110. Similarly, if prefetch register 135 is accessed for a byte while its first byte 324a is empty (as indicated by a high signal state on PFLE 337), or accessed for a word while one or both bytes (324a and 324b) are empty (as indicated by a high signal state of PFF* 336), the same ready signal is deasserted. Yet another type of occurrence which may result in deassertion of the ready signal is writing to the prestore while its synchronizing circuit 308 is still recovering from the immediately preceding write (as indicated by the signal PSRECOVER 340), or reading the prefetch register while its synchronizing circuit 328 is still recovering from the immediately preceding read (as indicated by the signal PFRECOVER 342). The deassertion of ready (in accordance with the specifications of the host bus) results in the occurrence of wait states on the host bus, thereby delaying completion of the access cycle. When the condition or conditions creating the need for the wait state are not longer active, the ready signal is asserted and the access cycle terminates. Means for delaying the access cycle, other than the deassertion of a ready signal, may be supported through an appropriate implementation of the host control logic 140, in accordance with the specifications of a given host bus.

Means for indicating the presence of data in the prefetch register 135 to the host system software are required. This can be done in two ways: by adding the number of bytes held in the prefetch register 135 to the count in the FIFO data counter 136 before the count is transferred to the host bus whenever counter 136 is accessed, or by making the status of flags 334 available to the host system by connecting these signals to appropriate bits in the status ports 178.

The host adapter of the presently preferred embodiment communicates with SCSI targets using the small computer system interface (SCSI) protocol, implementing arbitration, disconnect/reselection and asynchronous, synchronous and fast synchronous data protocols.

Those skilled in the art can now appreciate from the foregoing description that the broad teachings of the present invention can be implemented in a variety of forms. Therefore, while this invention has been described in connection with particular examples thereof, the true scope of the invention should not be limited since other modifications will become apparent to the skilled practitioner upon study of the drawings, specification and following claims.

What is claimed is:

1. A computer system interface for connection between a host computer bus and an input/output peripheral bus or interconnecting a host computer to a peripheral device, comprising;

an internal interface bus;

a single-ported main FIFO buffer operationally coupled to said internal interface bus wherein said single-ported main FIFO buffer includes a circuit for generating a read address and a write address, and further wherein said circuit selects one of said read address and said write address for the location accessed in said single-ported main FIFO buffer;

prestore means for temporarily storing information received from said host computer bus and to be sent said single-ported main FIFO buffer, said prestore means being operationally couple to said internal interface bus;

prefetch means for temporarily storing information received from said single-ported main FIFO buffer and to be sent to said host computer bus, said prefetch means being operationally coupled to said internal interface bus; and control logic means for causing information to flow from said single-ported main FIFO buffer to said prefetch means, and to further flow from said prefetch means to said host computer bus.

2. The apparatus of claim 1, wherein said circuit for generating a read address and write address in said single-ported main FIFO buffer comprises:

first address counter means for holding a first address value, and providing said first address value as a first output signal, said first address value being incremented each time said single-ported main FIFO buffer is written to;

second address counter means for holding a second address value, and providing said second address value as a second output signal, said second address value being incremented each time said single-ported main FIFO buffer is read from;

multiplexer means for selecting an address output signal, as determined by an input signal from said control logic means, from a first input signal and a second input signal wherein said first input signal is the first output signal of the first address counter means, and said second input signal is the second output signal of the second address counter means; and storage means, coupled to said address output signal of said multiplexer means, for holding data read from said internal interface bus.

3. The apparatus of claim 2, wherein said peripheral bus comprises a SCSI bus.

4. The apparatus of claim 3 wherein said prestore means comprises:

a set of registers;

synchronizing means for synchronizing write commands received from the host computer to a clock cycle of the internal interface bus; and a set of flags indicating the emptiness or fullness of said set of registers.

5. The apparatus of claim 4 wherein said prefetch means comprises;

a set of registers;

synchronizing means for synchronizing read commands received from the host computer bus to a clock cycle of the internal interface bus; and a set of flags indicating the emptiness or fullness of said set of registers.

* * * * *

UNITED STATES PATENT AND TRADEMARK OFFICE
CERTIFICATE OF CORRECTION

PATENT NO.    :   5,557,750
DATED         :   September 17, 1996
INVENTOR(S)   :   Moore, Richard S.; Pease, Allan F.

It is certified that error appears in the above-identified patent and that said Letters Patent is hereby corrected as shown below:

Col. 4, line 19, delete "FIFO60" and insert --FIFO160--.

Signed and Sealed this

Seventh Day of July, 1998

Attest:

BRUCE LEHMAN

Attesting Officer          Commissioner of Patents and Trademarks